United States Patent [19]

Giers

[11] Patent Number: 4,844,557
[45] Date of Patent: Jul. 4, 1989

[54] CIRCUIT CONFIGURATION FOR BRAKE SYSTEMS WITH ANTI-LOCK CONTROL AND/OR TRACTION SLIP CONTROL

[75] Inventor: Bernhard Giers, Rossdorf, Fed. Rep. of Germany

[73] Assignee: Alfred Teves GmbH, Fed. Rep. of Germany

[21] Appl. No.: 201,648

[22] Filed: Jun. 2, 1988

[30] Foreign Application Priority Data

Jun. 2, 1987 [DE] Fed. Rep. of Germany ....... 3718421

[51] Int. Cl.$^4$ .......................... B60T 8/64; B60T 8/70; B60T 8/82
[52] U.S. Cl. ..................................... 303/111; 303/96; 303/106; 364/426.02
[58] Field of Search ....................... 303/91, 92, 95, 96, 303/100, 103, 104, 106, 111; 180/197; 188/181 A, 181 C; 340/58; 364/426.02, 426.03

[56] References Cited

U.S. PATENT DOCUMENTS

| | | | |
|---|---|---|---|
| 3,131,975 | 5/1964 | Smith et al. | 303/104 |
| 3,840,278 | 10/1974 | Fleischer et al. | 303/111 |
| 4,355,298 | 10/1982 | Jessup | 340/53 |
| 4,484,280 | 11/1984 | Brugger et al. | 303/96 X |
| 4,521,856 | 6/1985 | Phelps et al. | 364/426.03 |
| 4,545,623 | 10/1985 | Sato et al. | 303/92 |
| 4,657,313 | 4/1987 | Fennel et al. | 303/111 |
| 4,657,314 | 4/1987 | Leiber | 303/96 X |

FOREIGN PATENT DOCUMENTS

| | | |
|---|---|---|
| 3127302 | 1/1983 | Fed. Rep. of Germany . |
| 3140959 | 5/1983 | Fed. Rep. of Germany . |
| 3234282 | 3/1984 | Fed. Rep. of Germany . |
| 3413733 | 10/1985 | Fed. Rep. of Germany . |
| 0015048 | 1/1982 | Japan .................................. 303/111 |

*Primary Examiner*—Andres Kashnikow
*Assistant Examiner*—Timothy Newholm
*Attorney, Agent, or Firm*—James B. Raden

[57] ABSTRACT

A circuit configuration for brake systems with anti-lock control and/or traction slip control is equipped with circuits for cornering identification and for generating signals characteristic of cornering. The differential speed between the wheels of one axle is measured. The speed difference signal is standardized. An error signal which is system-inherent and occurs also when driving straight ahead is generated by means of a low pass filter having a long time constant. The difference between the standardized speed difference signal and the error signal represents the cornering signal. Further, a quantity depending upon the speed of a wheel is compared with the cornering signal and checked for reasonableness. A second reasonableness check is based on the comparison and the evaluation of the cornering signals which were generated by the front axle and the rear axle irrespective of one another.

12 Claims, 2 Drawing Sheets

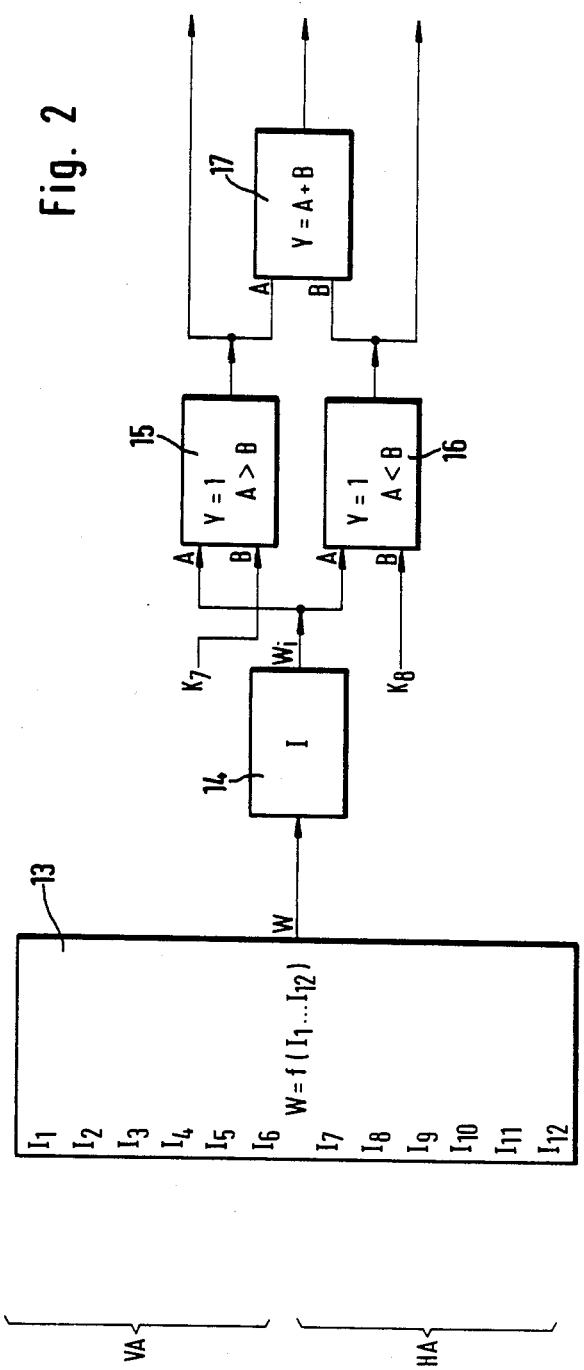
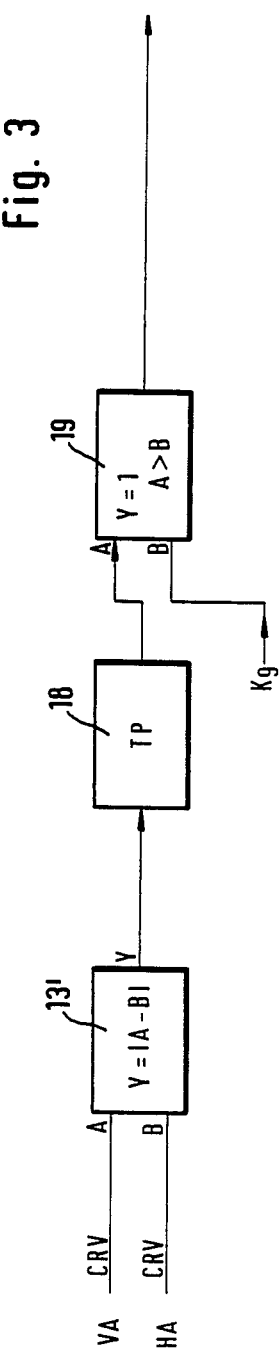

CIRCUIT CONFIGURATION FOR BRAKE SYSTEMS WITH ANTI-LOCK CONTROL AND/OR TRACTION SLIP CONTROL

BACKGROUND OF THE INVENTION

The present invention relates to a circuit configuration for a vehicular brake system with anti-lock control and/or reaction slip control which is equipped with wheel sensors for generating electric signals representative of the wheel rotational behavoir. Electronic circuits are provided for conditioning, logically combining and processing the sensor signals and for generating braking-pressure and/or starting-torque control signals. Circuits are provided for cornering indentification and for generating signals characcteristic of cornering and for comparing these signals with the vehicle speed.

A circuit configuration for automotive vehicles with traction control of this type is disclosed in German patent specification P 31 27 302. By means of the cornering-identification device described in this patent specification, a signal characteristic of cornering is obtained alone by evaluating the signals supplied by sensors which are arranged at the two wheels of the non-driven axle. In order to augment the driving stability, this cornering signal serves to reduce the starting torque of the vehicle enging during cornering if only one of the drive wheels tends to spin and, simultaneously, a threshold value of the vehicle speed is exceeded. The cornering identification is based solely on the measurement of the difference of the numbers of revolution between the two front wheels. Therefore, a difference between the numbers of revolution which is due to different tread radii of the two wheels, as caused by different tire profiles or tread wear, will result in an error signal, or the threshold of response of the cornering identification will be set to be so high that relatively narrow bends can only be detected which must be cornered with low speed for physical reasons.

Further, a circuit configuration for a slip-controlled brake system is known with a cornering-identification circuit which in each case sums up the slip of the two wheels of one vehicle side and compares it with the sum of slip of the wheels on the other vehicle side (U.S. Pat. No. 4,657,313 issued Apr. 14, 1987 and corresponding to German published patent application P 34 13 738). As soon as the difference of the slip value sums of both vehicle sides exceeds a limit value, the selection criteria will be temporarily changed, for instance from select-low to select-high, and thus the braking pressure variation. This way, the braking pressure variation is conformed to differing conditions when running straight and cornering, to the end that in each situation driving stability and steerability of the vehicle is maintained to the extent possible. Differences between the rotational speeds which are caused by different tread radii also impair the exactness of cornering identification and the evaluation of these signals in this known circuit.

SUMMARY OF THE INVENTION

Therefore, it is an object of the present invention to overcome the described shortcomings of known circuit configurations and to avoid the occurrence of error signals as well as faulty reactions in the cornering identification which are caused in particular by the different rolling circumferences of the individual wheels.

It has been found that this object can be achieved in a relatively simple and technically progressive fashion by a circuit configuration of the type initially referred to whose special features resides in that the circuits for generating the cornering signals (CRV) are equipped with circuit branches for ascertaining a speed difference signal which represents the differential speed between the wheels of a vehicle axle, and with circuit branches for determining a system-inherent error signal ($E_{sys}$) or correction signal which is independent of the instantaneous cornering action and which can be taken into account when evaluating the speed difference signals and when ascertaining the cornering signals (CRV).

Hence the instant invention recognizes that reliable identification of the cornering of a vehicle becomes possible under critical conditions, in particular at high speed which allows only a large bend radius, if the system-inherent error is found by so-called "long-time observation" and its influence on cornering is eliminated. This is because such system-inherent errors which, for example, emanate from differences of the rolling circumference and, when comparing the rotational speeds of the two wheels of an axle, result in a difference and fake cornering, are definitely within the order of magnitude of the useful signals. Differences in the rolling circumference of 5% may easily be caused by different wear of tires. On the other hand, a speed difference of 5%, with the rolling circumference being the same, is an evident signal for cornering.

Other causes for differences between the signals derived from the left and the right wheel of an axle when driving straight onward are tolerances of the mechanic and electronic component parts, etc. System-inherent errors change due to the changing of tires, due to displacement or aging of the component parts, for which reasons gauging actions would have to be required frequently to eliminate these errors. Yet this "gauging" is constantly performed by way of the circuit in accordance with the present invention. As will be explained hereinbelow, after the changing of a tire, the invention circuit configuration would be prepared for a new system-inherent error after a very short time. The circuit configuration according to the present invention requires but a few seconds to detect the new error or the new situation.

An exact cornering identification is of major advantage both for anti-lock control and for traction slip control. This applies for instance for measures for the weakening of yawing torques or for the pressure increase or the pressure control in a skidding vehicle. To control the traction slip when starting or accelerating in a bend, precise cornering identification, possibly even a bend radius identification, is likewise necessary.

In a preferred embodiment of the inventive circuit configuration, the discrepancy in percent of the speed of one wheel from the speed of the second wheel of the same axle is ascertained for generating the speed difference signal. The difference in speeds between the wheels of an axle is suitably standardized by division by the speed of the instantaneously slower wheel, if necessary, also by division by the speed of the faster wheel or by an averaged speed. This is of benefit for the further signal processing.

It is furthermore provided according to an embodiment of this invention for the determination of the system-inherent error signal or correction signal to supply the speed difference signal or the standardized differential speed to a low pass circuit having a large time constant in comparison with the duration of conventional cornering, e.g., a first-order low-pass filter with a time constant of at least 40 seconds. The time constant of this filter will then so-to-speak define the period of time which is necessary for "acquiring" the system-inherent error after the changing of a tire or after the ignition has been switched on.

Low-pass filters with switchable time constants can also be used which during travel straight ahead are dimensioned, e.g. to a time constant of roughly 30 to 120 seconds and which, on identification of cornering, can be switched over to a time constant of approximately 150 to 300 seconds.

Under certain conditions, "freezing-in" of an acquired system-inherent error for a specific time span is expedient. For this purpose, the inventive circuit configuration is provided with a circuit branch which can be supplied with the standardized speed difference signal and with a constant comparative value and which, when a maximum value of the speed difference signal is exceeded, precludes that this value is taken into account when determining or updating the error signal. It will thereby be prevented that a short-time disturbance which manifests itself in a too large speed different signal, or that a large useful signal (speed difference signal) which cannot be due to a system-inherent error of the type described and therefore must not be 'acquired', will have effects on the error signal. The differnce between the speed difference signal and the system-inherent error signal can be evaluated as cornering signal according to the instant invention.

Further, according to another embodiment of this invention, there are circuits which derive a cornering limit value from the instantaneous wheel speed, in particular from the speed of the slower wheel, and compare it with the instantaneous cornering signal and issue a spurious signal when the cornering signal exceeds the cornering limit value.

Cornering identification may further be improved by comparison and evaluation of the signals of the above-mentioned type derived from two (or more) axles of a vehicle. To this end, according to another embodiment of this invention, the output signals of the complete circuits allocated to the individual axles are delivered to an evaulation circuitry and checked for reasonableness. In doing so, the evaluating circuits are supplied by the individual complete circuits with information which imply the identification of cornering, the bend radius, the travel straight ahead, left-hand bend or right-hand bend, differential speed, etc., and all or some of these data.

Finally, in another embodiment of this invention, the presence of a characteristic difference between the signals of different vehicle axles which, for instance, are attributable to there being applied a spare wheel with a widely differing (e.g. 20%) tread radius, change-over of the logic and compensation of this discrepancy will be effected.

BRIEF DESCRIPTION OF THE DRAWING

Further features, advantages and applications of this invention become apparent from the following description of embodiments by way of the accompanying drawing wherein:

FIG. 2 is, similar to the illustration in FIG. 1, a circuit configuration for evaluating and combining the signals derived from two vehicle axles and generated with each one circuitry according to FIG. 1; and, FIG. 3 is a circuit configuration in accordance with the present invention for detecting and evaluating a characteristic difference between signals of the front and the rear axle.

DETAILED DESCRIPTION OF A PREFERRED EMBODIMENT

Figure 1:
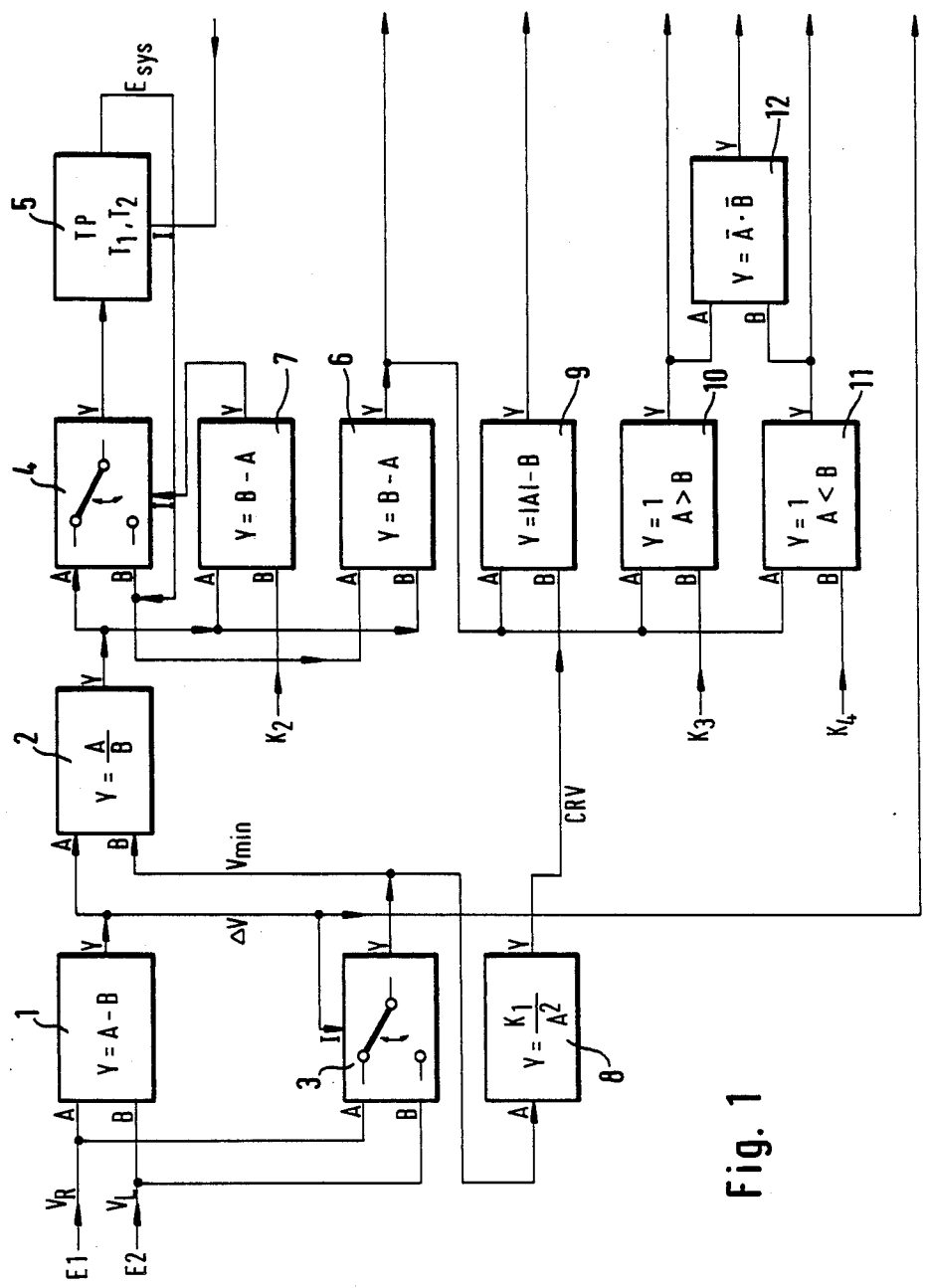
FIG. 1 is a simplified and symbolic block diagram view of a circuit configuration according to this invention for comparison and evaluation of the rotational behavior of the two wheels of an axle.

The drawing figures serve to illustrate the circuits in accordance with the present invention which generate the cornering signals and which provide an electronic circuit configuration for the control of vehicle brake systems with anti-lock control and/or traction slip control. In FIGS. 1 to 3, the signals at the inputs of the individual circuit blocks or circuit branches are referred to by A and B, while the output signal is assigned a Y.

According to FIG. 1, the circuits are supplied with electric signals ($V_R$, $V_L$) by way of the inputs E1 and E2 of the complete circuit, which signals have been obtained by means of sensors arranged at the front wheels in the illustrated embodiment and which in each case represent the rotational behavior of one of the two front wheels. The wheel sensors and the normally necessary circuits for conditioning the signals are not shown in FIG. 1 as they are no part of this invention. In a difference former 1, a speed difference signal v is formed whose sign permits recognition of whether a right-hand bend or a left-hand bend is present. During travel straight ahead and under ideal conditions, that means equal tread radii etc., the signal at the output Y of stage 1 becomes zero. In a subsequent divider stage 2, the differential speed v will be standardized by dividing the difference signal v by the lesser of the two wheel speeds $V_{min}$. To this end, the lesser speed $V_{min}$ was found by a selection stage 3 and delivered to the input B of stage 2. The standardized differential speed $v_n = v/v_{min}$ at the output of the divider 2 is supplied by way of a transfer switch 4 to a low pass 5, herein a first-order low-pass filter with switchable time constant. The output signal of this low pass 5 represents the error signal or correction signal $E_{sys}$ which is a measure for the system-inherent errors which will cause a speed difference signal also when the vehicle drives straight onward. Finally, the difference between the standardized differential speed $V_n$ and the error signal or correction signal $E_{sys}$ is formed in another difference former 6. This signal $CRV = V_n - E_{sys}$ serves for cornering identification, and if the resolution of this signal so allows, is even a measure of the bend radius. It can be recognized from the sign of the cornering signal CRV whether a right-hand or a left-hand bend is at issue.

The low-pass filter 5 is switchable. In the initial position which it assumes as long as the signal at the control input I is zero, the time constant $T_1$ of the low-pass filter 5 is set to a value between 40 and 100 seconds. If, however, "cornering" was detected in the preceding calculating cycle (loop), this is signalled to the low-pass filter 5 by way of the control input I. A signal at the input I results in change-over of the stage 5 or increase of the time constant to $T_2 = 200$ to 300 seconds. Change-over of the time constants can simply be realized by increase of the ohmic resistance of an RC-member. Consequently, during cornering, the change of the error signal $E_{sys}$ at the output of stage 5 as a consequence of the value of the standardized differential speed $V_n$ being increased due to cornering is delayed considerably. During travel straight ahead, however, system-inherent errors are "acquired" with the speed of the time constant $T_1$.

Disturbances which cause a too high standardized differential speed $V_n$ that is in excess of a predetermined threshold value, as well as useful signals which are larger than the signals which can be caused by system-inherent errors, are suppressed by an additional circuit branch containing another difference former 7. This threshold value is symbolized by the constant $k_2$ at the input B of the difference former 7. Whenever the standardized differential speed $V_n$ exceeds a predefined value, a signal will result at the output of stage 7 which causes change-over of the switch 4 by way of the control input I. Thereby, the error signal $E_{sys}$ is returned by way of the input B of the switch 4 to the input of the low pass 5, in consequence whereof the acquired error is "frozen" or the error signal $E_{sys}$ is kept constant for the duration of the disturbance.

A check of the cornering signal CRV according to reasonableness criteria is achieved by means of an additional circuit branch (8, 9). For this purpose, first the speed $V_{min}$ of the slower wheel of the axle considered is compared with table values in stage 8. The output signal $CRV_{grenz}$ of stage 8 is directly or indirectly a measure for the bend radius below which the vehicle cannot drop at the measured vehicle speed $V_{min}$ without jeopardizing the driving stability, and thus it is a measure for the maximum value or limit value of the cornering signal CRV. As is known, a narrow bend can be cornered by a vehicle at low speed only. It may be recognized from a comparison of the limit value $CRV_{grenz}$ with the cornering signal CRV, whether a like bend radius is possible at all at the measured speed, the said limit value being derived from the instantaneous speed $V_{min}$ and being available at the output of stage 8. The comparison is performed with the aid of the difference former 9. If the reasonableness criterion is not fulfilled, stage 9 will signal a malfunction.

Two further circuit branches 10 and 11 serve to evaluate the sign of the cornering signal CRV and hence to determine whether the vehicle is cornering to the right or to the left. Finally, "travel straight ahead" is still signalled by way of the output of another branch 12 in the absence of either a right-hand bend signal or a left-hand bend signal.

FIG. 2 shows an evaluation matrix of evaluation circuit 13 which is supplied with the signals of the front axle and rear axle generated with the complete circuit according to FIG. 1. By means of individual complete circuits (1 to 12) of the type shown in FIG. 1, the front-axle and rear-axle signals are generated irrespective of one another.

Checking the front axle and rear-axle signals for reasonableness by virtue of the evaluating circuit 13 permits detection of errors or disturbances and improves the signal analysis. Apart from special cases, the corresponding signals derived from the front axle and the rear axle must be coincident. The results of the evaluations made by the circuit 13 are combined in an integrator 14 inserted after the evaluating circuit 13. After a comparison with limit values which are symbolized by the constants $k_7$ and $k_8$ of the subsequent stages 15 and 16 in FIG. 2, the signal $W_I$ at the output of the integrator 14 allows a reliable indication of cornering and the direction of the bend, that means "right-hand bend" or "left-hand bend". A cornering-identification signal is generated by way of an OR-gate 17.

When comparing the input information at the inputs $I_1$ to $I_6$ with the corresponding information at the inputs $I_7$ to $I_{12}$, contradicting input values will make the output signal W of the circuit 13 minimal, while in the event of input values that make sense it will assume a maximum amount. The integrator 14 inserted after will then supply a signal $W_i$ which sums up the results of the consecutive evaluations.

FIG. 3 illustrates an additional circuit which serves to recognize that a spare-wheel (mini-spare wheel) is fitted. Such spare wheels have a rolling circumference which is roughly up to 20% less than that of the standard wheels. The mounting of a like spare wheel shows in that a relatively high diffrnetial speed and thus a seeming cornering signal CRV occurs at one axle only.

That is to say, the comparison of the CRV-signals of front axle VA and rear axle HA by means of an evaluating circuit 13' results in a difference signal typical of the mounting of a mini-spare wheel. "Long-time observation" also will permit detection of this case, and to enable a correction of the erroneous wheel speed produced by the spare wheel. To this effect, the low-pass filter 18 is furnished with a time constant of, for example, 2 to 30 seconds. The output signal of this low-pass filter 18 is compared in the subsequent comparator 19 with a typical threshold value symbolized by the constant $k_g$. If the output signal of stage 18 exceeds the threshold value $k_g$ for a long time, this leads to conclude that the mini-spare wheel is mounted. The control can be adapted to the special situation by reducing the rotational speed measured at the location of the spare wheel by an amount calculated from the lesser wheel diameter.

What is claimed is:

1. A circuit configuration for vehicular brake systems with slip control, equipped with wheel sensors for generating electric signals representative of the wheel rotational behavior, with electronic circuits for conditioning, logically combining and processing the sensor signals and including control means for generating slip control signals, with circuits cooperating with said control means for the cornering identification and for generating signals characteristic of cornering and for comparing these signals with the vehicle speed, wherein the circuits for generating the cornering signals are provided with means including circuit branch means for ascertaining a different speed signal which represents the differential speed between the wheels of a vehicle axle, and with additional circuit branch means for determining a system-inherent error signal which is independent of the instantaneous cornering action and further including means for comparing said system-inherent error signal with said speed difference signal to produce said cornering signals and for generating said slip control signals based upon said cornering signals.

2. The circuit configuration as claimed in claim 1, wherein said circuit branch means include means for ascertaining the discrepancy in percent of the speed of one wheel from the speed of the second wheel of the same axle for defining the speed difference signal.

3. The circuit configuration as claimed in claim 2, wherein for defining the speed difference signal, the difference in speed between the wheels of one axle is standardized by division by a wheel speed.

4. The circuit configuration as claimed in claim 3, wherein for the determination of the error signal, the speed difference signal or the standardized differential speed is supplied to a low pass having a long time constant in comparison with the duration of conventional cornering.

5. The circuit configuration as claimed in claim 1, wherein allocated to each of the axles of a vehicle is one complete circuit to generate the cornering signal independent of the other axles, and wherein the output signals of these complete circuits are delivered to an evaluating circuit.

6. The circuit configuration as claimed in claim 5, wherein the evaluating circuit is supplied by the individual complete circuits with information on at least one of the identification of cornering, the bend radius, the travel straight ahead, left-hand bend, right-hand bend, and differential speed.

7. The circuit configuration as claimed in claim 6, wherein there are provided further circuit branch means which, in the presence of a characteristic difference between the signals of different vehicle axles or complete circuits, the said difference being due to the mounting of a spare wheel with a different tread radius, will cause a corresponding correction of the evaluating circuit.

8. A circuit configuration for vehicular brake systems with slip control, equipped with wheel sensors for generating electric signals representative of the wheel rotational behavior, with electronic circuits for conditioning, logically combining and processing the sensor signals and including control means for generating slip control signals, with circuits cooperating with said control means for the cornering identification and for generating signals characteristic of cornering and for comparing these signals with the vehicle speed, wherein the circuits for generating the cornering signals are provided with means including circuit branch means for ascertaining a difference speed signal which represents the differential speed between the wheels of a vehicle axle, and with additional circuit branch means for determining a system-inherent error signal which is independent of the instantaneous cornering action and which are utilized when evaluating the speed difference signals and when ascertaining the cornering signals, including means for ascertaining the discrepancy in percent of the speed of one wheel from the speed of the second wheel of the same axle for defining the speed difference signal, wherein for defining the speed difference signal, the difference in speed between the wheels of one axle is standardized by division by a wheel speed, wherein for the determination of the error signal, the speed difference signal or the standardized differential speed is supplied to a low pass having a long time constant in comparison with the duration of conventional cornering, wherein said low pass comprises a low-pass filter having a switchable time constant in which changeover to a still longer time constant will be effected in the presence of a cornering signal.

9. A circuit configuration for vehicular brake systems with slip control, equipped with wheel sensors for generating electric signals representative of the wheel rotational behavior, with electronic circuits for conditioning, logically combining and processing the sensor signals and including control means for generating slip control signals, with circuits cooperating with control means for the cornering identification and for generating signals characteristic of cornering and for comparing these signals with the vehicle speed, wherein the circuits for generating the cornering signals are provided with means including circuit branch means for ascertaining a difference speed signal which represents the differential speed between the wheels of a vehicle axle, and with additional circuit branch means for determining a system-inherent error signal which is independent of the instantaneous cornering action and which are utilized when evaluating the speed difference signals and when ascertaining the cornering signals, including means for ascertaining the discrepancy in percent of the speed of one wheel from the speed of the second wheel of the same axle for defining the speed difference signal, wherein for defining the speed difference signal, the difference in speed between the wheels of one axle is standardized by division by a wheel speed, wherein for the determination of the error signal, the speed difference signal or the standardized differential speed is supplied to a low pass filter having a long time constant in comparison with the duration of conventional cornering, wherein during travel straight ahead, the low-pass filter is dimensioned to a time constant of 3- to 120 seconds and is switched over to a time constant of 150 to 300 seconds.

10. A circuit configuration for vehicular brake systems with slip control, equipped with wheel sensors for generating electric signals representative of the wheel rotational behavior, with electronic circuits for conditioning, logically combining and processing the sensor signals and including control means for generating slip control signals, with circuits cooperating with said control means for the cornering identification and for generating signals charcteristic of cornering and for comparing these signals with the vehicle speed, wherein the circuits for generating the cornering signals are provided with means including circuit branch means for ascertaining a difference speed signal which represents the differential speed between the wheels of a vehicle axle, and with additional circuit branch means for determining a system-inherent error signal which is independent of the instantaneous cornering action and which are utilized when evaluating the speed difference siganls and when ascertaining the cornering signals, wherein there is provided a circuit branch which is furnished with a standardized speed difference signal and with a constant comparative value and which, when a maximum value of the speed difference signal is exceeded, precludes that this signal is taken into account when determining or continuously correcting the error signal.

11. The circuit configuration as claimed in claim 10, including means for evaluating the difference between the speed difference signal and the error signal as a cornering signal.

12. The circuit configuration as claimed in claim 10, wherein there are provided further circuit branch means which derive a cornering limit value from the instantaneous wheel speed, of the slower wheel, and compare it with the instantaneous cornering signal and which issue a spurious signal when the cornering signal exceeds the cornering limit value.

* * * * *